(12) United States Patent
Kim et al.

(10) Patent No.: US 11,335,980 B2
(45) Date of Patent: May 17, 2022

(54) FLEXIBLE BATTERY

(71) Applicants: LiBEST INC., Daejeon (KR);
KHVATEC CO., LTD., Gumi-si (KR)

(72) Inventors: Joo Seong Kim, Daejeon (KR); Jin Hong Ha, Daejeon (KR); Kwang Seok Kim, Cheonan-si (KR); Gil Ju Lee, Daejeon (KR); Keum Bong Han, Gwangju (KR); Jae Sung Choi, Daejeon (KR); Joon Sik Chung, Daejeon (KR); Hyuk Sang Jo, Daejeon (KR)

(73) Assignees: LiBEST INC., Daejeon (KR);
KHVATEC CO., LTD., Gyeongsangbuk-Do (KR)

( * ) Notice: Subject to any disclaimer, the term of this patent is extended or adjusted under 35 U.S.C. 154(b) by 99 days.

(21) Appl. No.: 16/573,207

(22) Filed: Sep. 17, 2019

(65) Prior Publication Data
US 2020/0014016 A1    Jan. 9, 2020

Related U.S. Application Data

(63) Continuation of application No. PCT/KR2017/011815, filed on Oct. 25, 2017.

(30) Foreign Application Priority Data

Mar. 17, 2017   (KR) .................. 10-2017-0033539

(51) Int. Cl.
*H01M 50/54*    (2021.01)
*H01M 50/10*    (2021.01)

(52) U.S. Cl.
CPC ........... *H01M 50/54* (2021.01); *H01M 50/10* (2021.01)

(58) Field of Classification Search
CPC ............ H01M 10/0436; H01M 50/54; H01M 50/553; H01M 50/55; H01M 50/10
See application file for complete search history.

(56) References Cited

U.S. PATENT DOCUMENTS 7,763,377 B2 *   7/2010   Kozuki ............... H01M 50/538
                                                               429/122
2001/0019797 A1  9/2001   Kezuka et al.
(Continued)

FOREIGN PATENT DOCUMENTS

CN         1313643 A     9/2001
EP         1128450 A2    8/2001
(Continued)

OTHER PUBLICATIONS

English Translation of JP2000173559, Thin Battery Bag Body, Tokai Rubber IND Ltd. Publication Date Jun. 23, 2020 (Year: 2000).*

(Continued)

*Primary Examiner* — Matthew T Martin
*Assistant Examiner* — Adam J Francis
(74) *Attorney, Agent, or Firm* — Hamre, Schumann, Mueller & Larson, P.C.

(57) ABSTRACT

A flexible battery may include: an electrode assembly having one or more unit cells each of the unit cells including a pair of electrode plates having different polarities, a separator interposed between the respective electrode plates and electrode tabs that protrude from the respective electrode plates; a pair of electrode leads connected to electrode tabs; and a strengthening tab fixed on any one electrode lead connection tab among the electrode tabs.

9 Claims, 18 Drawing Sheets

(56) References Cited

U.S. PATENT DOCUMENTS

| | | | |
|---|---|---|---|
| 2013/0101884 A1 | 4/2013 | Ueda | |
| 2016/0118640 A1* | 4/2016 | Miyake | H01M 50/209 429/163 |
| 2017/0214028 A1* | 7/2017 | Oh | H01M 10/0585 |
| 2018/0026254 A1* | 1/2018 | Oh | H01M 50/20 429/153 |

FOREIGN PATENT DOCUMENTS

| | | | | |
|---|---|---|---|---|
| EP | 3043404 A1 | 7/2016 | | |
| JP | 2000173559 A | * | 6/2000 | ............. Y02E 60/10 |
| JP | 2000173559 A | | 6/2000 | |
| JP | 2000235850 A | | 8/2000 | |
| JP | 2002141055 A | | 5/2002 | |
| JP | 2016039091 A | | 3/2016 | |
| JP | 2016085962 A | | 5/2016 | |
| KR | 1020080009350 A | | 1/2008 | |
| KR | 1020130063709 A | | 6/2013 | |
| KR | 101292998 B1 | | 8/2013 | |
| KR | 10101292998 B1 | | 8/2013 | |
| KR | 1020130119700 A | | 11/2013 | |
| KR | 1020150134673 A | | 12/2015 | |
| KR | 1020160032930 A | | 3/2016 | |
| KR | 1020160090106 A | | 7/2016 | |
| WO | 2012140709 A1 | | 10/2012 | |
| WO | WO-2016056875 A2 | * | 4/2016 | ........ H01M 10/0585 |
| WO | 2016167457 A1 | | 10/2016 | |

OTHER PUBLICATIONS

International Search Report and Written Opinion (in English and Korean) issued in PCT/KR2017/011815, dated Jan. 31, 2018, 18 pages provided.

The extended European Search Report for issued in European application No. 17900776.0, dated Dec. 18, 2020, 8 pages provided.

* cited by examiner

ELECTRODE LEAD : Al, Ni, Cu(coated Ni)

CURRENT COLLECTOR : Al, SUS, Cu

FORM PATTERN (UPPER STAMPING SECTION + LOWER STAMPING SECTION) IN DIRECTION PARALLEL TO WIDTH OF CASE

WAVE PATTERN

BREAKAGE OCCURS DURING BENDING TEST
AMONG FLEXIBLE BATTERY TEST ITEMS

FLEXIBLE BATTERY

TECHNICAL FIELD

The present disclosure relates to a flexible battery having a joint strengthening structure between an electrode tab and an electrode lead.

BACKGROUND

A secondary battery refers to a battery, which can be charged and discharged, as opposed to a primary battery which cannot be charged, and has been widely used in the field of advanced electronic devices such as cellular phones, notebook computers, camcorders, and the like. The form factor of such electronic devices is becoming lighter, if not smaller, all the while performance is improving. Add to those advancements in the development and implementation of the Internet of Things (IoT), and secondary batteries as power supplies take on greater importance.

Lithium secondary batteries have a higher voltage than nickel-cadmium batteries or nickel-hydrogen batteries, which are mainly used as power supplies for portable electronic devices and also have a high energy density per unit weight. Therefore, demand for lithium secondary batteries is increasing.

A secondary battery typically utilizes an electrochemical reaction occurring between an electrolyte and a positive electrode and a negative electrode when the positive electrode and the negative electrode are connected to each other when inserted into the electrolyte. Unlike conventional primary batteries, a secondary battery can be recharged by a charger and used again.

Typically, a lithium secondary battery includes a jelly-roll type electrode assembly in which a separator is inserted between a positive electrode plate and a negative electrode plate and is then spirally wound together; or includes a flexible stacked type electrode assembly in which multiple positive electrode plates and negative electrode plates are stacked with a separator interposed therebetween. For example, a cylindrical battery may be manufactured by housing the jelly-roll type electrode assembly in a cylindrical can, injecting an electrolyte therein, and sealing the can; and a prismatic battery may be manufactured by pressing the jelly-roll type electrode assembly or the stacked type electrode assembly to be flat and then housing the flat electrode assembly in a prismatic can. Further, a pouch type battery may be manufactured by packing the jelly-roll type electrode assembly or the stacked type electrode assembly together with an electrolyte in a pouch type case. In such an electrode assembly, a positive electrode tab and a negative electrode tab may be withdrawn from a positive electrode plate and a negative electrode plate, respectively, to the outside of the electrode assembly and then connected to a positive electrode and a negative electrode of a secondary battery.

Meanwhile, an electrode tab on multiple positive electrode plates and negative electrode plates stacked in a vertical direction may be connected to an electrode lead. A conventional joint structure between an electrode tab and an electrode lead slightly decreases in coherence during direct welding. Thus, when a battery is bent during use, a problem occurs in the joint between the electrode tab and the electrode lead.

According to conventional technologies, when a battery assembly is bent, compressive stress is applied to an inner bent portion and tensile stress is applied to the opposite side. Therefore, a case that covers an electrode assembly of the battery also expands or contracts, thus incurring mechanical damage.

DETAILED DESCRIPTION

Figure 1:
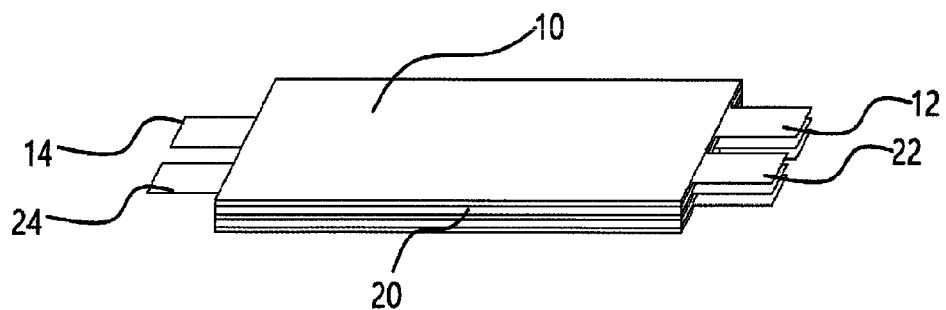
FIG. 1 is an illustration of an example configuration of an electrode assembly included in a flexible battery, according to the present disclosure.

The embodiments described, recited, and even contemplated herein provide a stable flexible battery that has a strengthening tab formed as a metal plate of a predetermined thickness placed between an electrode lead and an electrode lead connection tab that is included in an electrode assembly. An end of the electrode lead may be bent 180° in a direction opposite toward the outside of the electrode assembly while it is welded on the electrode lead connection tab, thus electrochemical properties may be maintained by minimizing a local mechanical load caused by bending of the flexible battery.

A flexible battery assembly according to the present disclosure may include: at least: an electrode assembly that may be equipped with one or more unit cells, each of the unit cells including a pair of electrode plates having different polarities, a separator interposed between the respective electrode plates, and electrode tabs protruding from the respective electrode plates but not coated with an electrode mixture; a strengthening tab welded and fixed on any one electrode lead connection tab among the electrode tabs included in the electrode assembly; and a pair of electrode leads welded on the strengthening tab and the other electrode lead connection tab, respectively. Either electrode lead of the pair of electrode leads may be welded on the strengthening tab, which is added between the electrode lead connection tab and the electrode lead and connected to the electrode lead connection tab. Either electrode lead of the pair of electrode leads may be bent in a direction toward the outside of the electrode assembly from a direction toward the inside of the electrode assembly.

A tab-tab joint portion may include electrode plates having the same polarity electrically connected in parallel to each other through an electrode parallel connection tab, and the tab-tab joint portion may be taped on a separator that covers an outer surface of the outermost electrode plate placed on the uppermost or lowermost end of the electrode assembly.

The flexible battery may further includes a case that has upper stamping sections and lower stamping sections repeatedly stamped to surround the outside of the electrode assembly. The multiple upper stamping sections and lower stamping sections are successively formed in a direction parallel to the width of the electrode assembly and the case.

A tab-lead joint portion that is backed and strengthened using the strengthening tab and is located between the electrode lead connection tab and the electrode lead may be inserted into the electrode assembly, and a tab-lead joint portion that includes an electrode lead bending joint structure may be inserted in the electrode assembly.

The electrode plates included in the electrode assembly may include a first electrode plate E1 that includes the electrode lead connection tab and the electrode parallel connection tab on opposing sides and a second electrode plate E2 that includes only the electrode parallel connection tab on one side, and an electrode mixture may be coated on the second electrode plate E2 to cover the electrode lead connection tab of the first electrode plate E1.

According to the embodiments described, recited, and contemplated herein, it is possible to implement a stable flexible battery having a structure in which a strengthening tab that is formed as a metal plate of a predetermined thickness may be placed between an electrode lead and an electrode lead connection tab that is included in an electrode assembly, and an end of the electrode lead may be bent 180° in a direction opposite toward the outside of the electrode assembly while it is welded on the electrode lead connection tab. Thus, electrochemical properties may be maintained by minimizing a local mechanical load caused by bending of the flexible battery.

Embodiments of a flexible battery are described, recited, and suggested herein with reference to the accompanying drawings.

The following exemplary embodiments are provided only for understanding of the present disclosure but not intended to limit the right scope of the present disclosure. Therefore, embodiments that perform the same functions in the same scope as those presently disclosed and recited are also included in the right scope of the present disclosure.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terms such as first, second, A, B, (a), (b), etc. can be used. These terms are used only to differentiate the components from other components. Therefore, the nature, order, sequence, etc., of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween.

Figure 2:
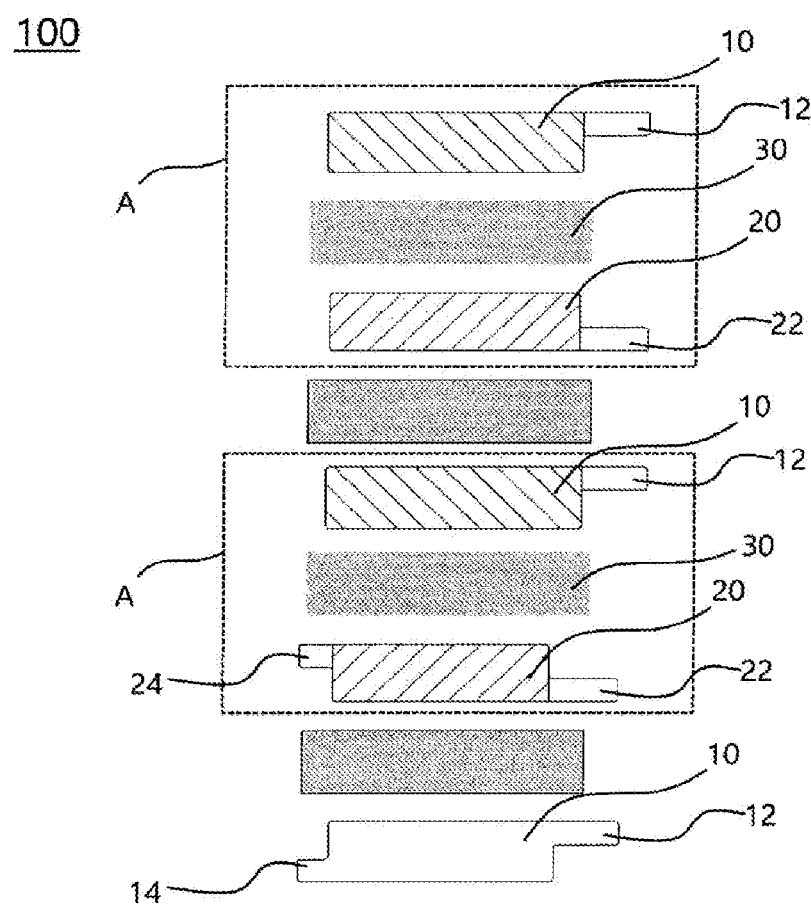
FIG. 2 is an exploded view of the example configuration of an electrode assembly of FIG. 1.

FIG. 1 illustrates an example configuration of an electrode assembly included in a flexible battery, according to the present disclosure; and FIG. 2 is an exploded view of the example configuration of an electrode assembly of FIG. 1.

An electrode assembly 100 includes unit cells, each including a negative electrode plate 10 and a positive electrode plate 20 with a separator 30 interposed therebetween, an electrolyte serving as an ion transport medium between negative electrode plate 10 and positive electrode plate 20, and electrode tabs 12, 14, 22 and 24 protruding from the electrode plates 10 and 20 may be used to implement electrode parallel connection and as an electrode lead connection, depending on the application. Any one or more of the electrode plates including the negative electrode plate 10 and the positive electrode plate 20 may be equipped on both sides with an electrode parallel connection tab and an electrode lead connection tab spaced apart from each other. For example, a negative electrode plate 10 placed on the lowermost end of the electrode assembly 100 may be equipped with a negative electrode parallel connection tab 12 and a negative electrode lead connection tab 14, and a positive electrode plate 20 placed on the opposite side of the separator facing the negative electrode 10 may be equipped with a positive electrode parallel connection tab 22 and a positive electrode lead connection tab 24.

One or both of the top and bottom surfaces of each electrode plate serving as a current collector may be coated with an electrode mixture, and the electrode parallel connection tabs and the electrode lead connection tabs protrude from the electrode plates. The electrode parallel connection tabs and the electrode lead connection tabs may be exposed without being coated with the electrode mixture.

The multiple electrode plates having the same polarity may be connected to each other through an electrode parallel connection tab. That is, multiple negative electrode plates 10 and multiple positive electrode plates 20 are electrically connected in parallel to each other forming a tab-tab joint portion connecting electrode tabs 12 and 22. The electrode assembly may be electrically connected through the electrode lead connection tab 14 and 24 to an electrode lead 60 exposed to the outside of a case. The separator 30 physically separates the electrode plates, but allows ions contained in the electrolyte to pass through.

As for the negative electrode plates placed on the uppermost end and the lowermost end of the electrode assembly, only one surface of each negative electrode plate may be coated with a negative electrode mixture.

Electrode parallel connection tab 12 or 22 protruding from negative electrode plate 10 or positive electrode plate 20 electrically connects electrode plates having the same polarity in parallel to each other. Tab-tab joint portions connected in parallel to each other are located on the separator covering an outer surface of the outermost electrode plate placed and taped on the uppermost end or the lowermost end of the electrode assembly.

FIGS. 1 and 2 show a tab-tab joint portion where electrode parallel connection tabs 12 and 22 on the electrode plate are connected in parallel to each other and a tab-lead joint portion where the electrode lead connection tabs 14 and 24 and the electrode lead are connected to each other. The tab-tab joint portion and the tab-lead joint portion are electrically connected and joined to each other by any one of spot welding, laser welding, or a conductive adhesive.

Figure 3A:
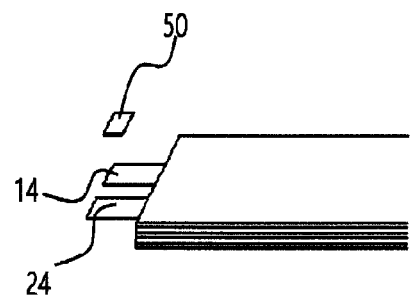
FIGS. 3A-D illustrate an example process producing a backing and strengthening structure using a strengthening tab between an electrode lead connection tab and an electrode lead, in accordance with at least one embodiment disclosed herein.

FIGS. 3A-D illustrate an example process producing a backing and strengthening structure using a strengthening tab between an electrode lead connection tab and an electrode lead, in accordance with at least one embodiment disclosed herein. FIG. 3A shows a separate strengthening tab 50 added to electrode lead connection tabs 14 and 24 that are placed on one side of the electrode assembly of FIGS. 1 and 2. Strengthening tab 50 may be joined to an electrode lead 60. Thus, a backing structure for the electrode lead connection tabs 14 and 24 and the electrode lead 60 may be formed using the strengthening tab 50. The strengthened joint method for electrode lead connection tabs 14 and 24 and the electrode lead 60 may be applied to at least any one of a positive electrode tab and a negative electrode tab.

FIG. 3A shows that, among multiple electrode plates included in an electrode assembly, an electrode equipped with an electrode lead connection tab may protrude to one side of the electrode assembly to be joined to strengthening tab 50, which may be formed of a metal material.

Figure 3B:
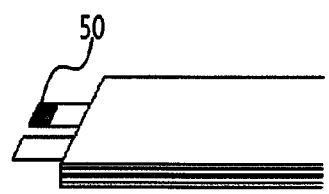

FIG. 3B shows that strengthening tab 50 may be joined on the electrode lead connection tab 14.

Figure 3C:
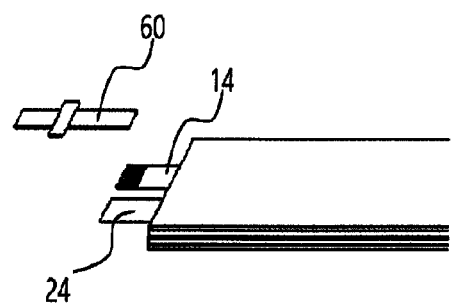

FIG. 3C shows that the electrode lead 60 may be prepared to be joined on the electrode lead connection tab 14 on which the strengthening tab 50 is added.

Figure 3D:
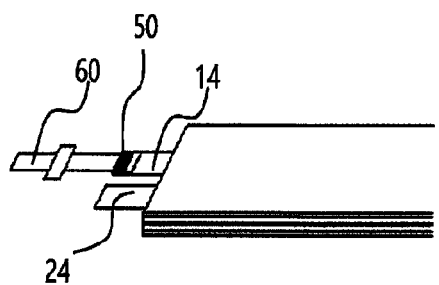

FIG. 3D shows that the electrode lead 60 may be joined on the electrode lead connection tab 14 on which the strengthening tab 50 is added.

Figure 4:
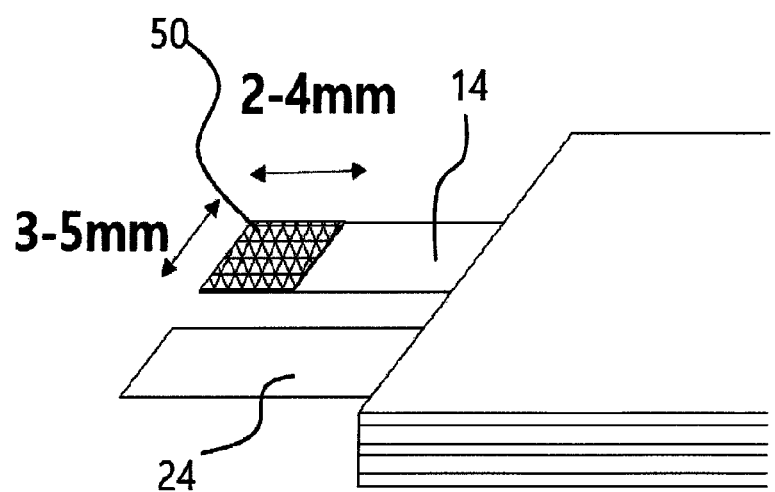
FIG. 4 shows different sizes of a strengthening tab added on an electrode lead connection tab, in accordance with at least one embodiment disclosed herein.

FIG. 4 shows different sizes of a strengthening tab added on an electrode lead connection tab, in accordance with at least one embodiment disclosed herein. As shown, the strengthening tab 50 added on the electrode lead connection tab 14 reinforces the strength of a joint portion between the electrode lead connection tab 14 and the electrode lead 60 and thus physically strengthens the joint portion.

On an upper end of the electrode lead connection tab 14 and 24 extended from the electrode plate 10 and 20 of the electrode assembly, the strengthening tab 50 formed of a homogeneous or heterogeneous metal and having a thickness one to three times greater than the electrode lead connection tab is added by backing and welded. The strengthening tab 50 added by backing and the electrode lead connection tab 14 and 24 may have the same thickness or different width.

The added strengthening tab 50 may have a width of 3 mm to 5 mm and a length of 2 mm to 4 mm. However, this is just an example and the present disclosure is not limited thereto.

Figure 5:
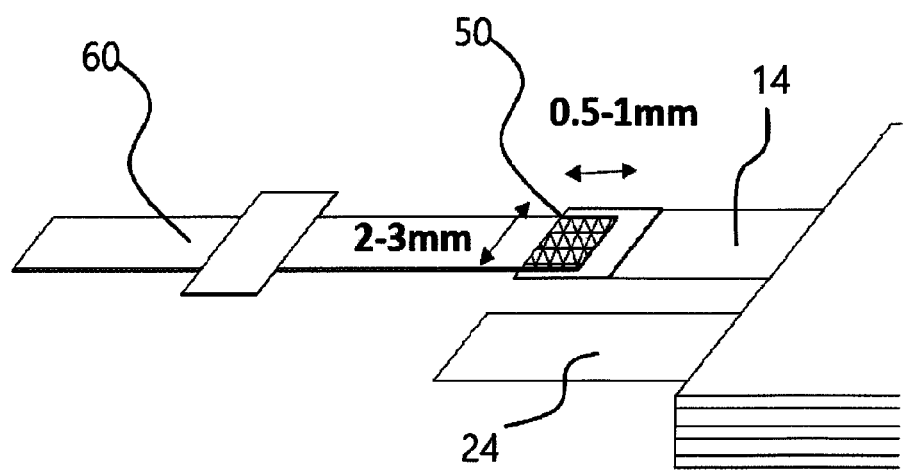
FIG. 5 shows different sizes of a tab-lead joint portion with an electrode lead joined on an electrode lead connection tab, in accordance with at least one embodiment disclosed herein.

FIG. 5 shows different sizes of a tab-lead joint portion with an electrode lead joined on an electrode lead connection tab, in accordance with at least one embodiment disclosed herein. As shown, the electrode lead 60 assembled on the strengthening tab 50 added by backing and joined to the electrode lead connection tab may have a width of, e.g., 2 mm to 3 mm and a length of, e.g., 0.5 mm to 1 mm. However, this is just an example and the present disclosure is not limited thereto. The electrode plates in the present disclosure may be any one of a group consisting of aluminum, stainless steel and copper, and the electrode lead may be formed of any one material of a group consisting of aluminum, nickel, and nickel-coated copper.

Figure 6:
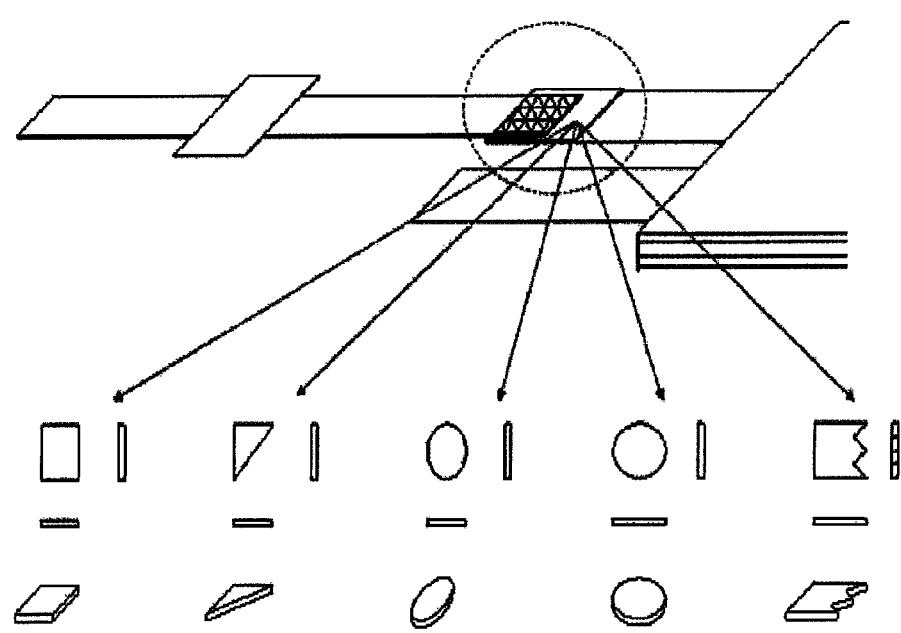
FIG. 6 shows different shapes of a strengthening tab added between an electrode lead connection tab and an electrode lead on a flexible battery, in accordance with various embodiments disclosed herein.

FIG. 6 shows different shapes of a strengthening tab added between an electrode lead connection tab and an electrode lead on a flexible battery, in accordance with various embodiments disclosed herein. As depicted, the strengthening tab 50 added by backing on the tab-lead joint portion for the electrode lead connection tab 14 and 24 and the electrode lead 60 may be formed into any one shape of a group consisting of a circular shape, an oval shape, and a polygonal shape.

FIGS. 7A-D illustrate a process of joining on an electrode lead connection tab by using an electrode lead bending structure, according to various embodiments disclosed herein. As depicted, electrode lead 60 may be joined to electrode lead connection tabs 14 and 24 on one side of the electrode assembly.

Figure 7A:
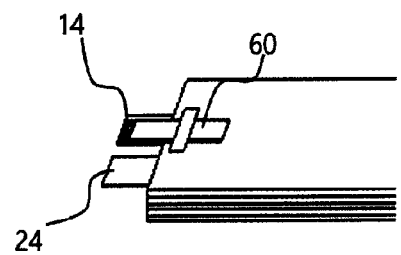
FIGS. 7A-D illustrate a process of joining on an electrode lead connection tab by using an electrode lead bending structure, according to various embodiments disclosed herein.
Figure 7B:
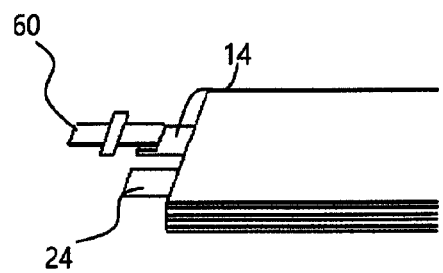
Figure 7C:
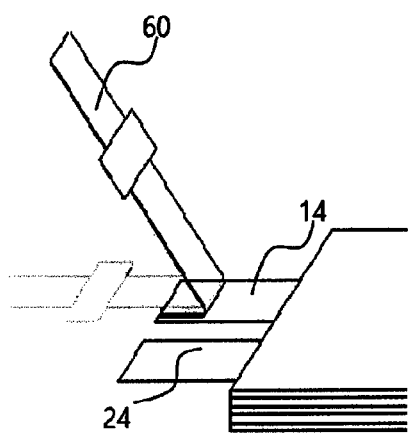
Figure 7D:
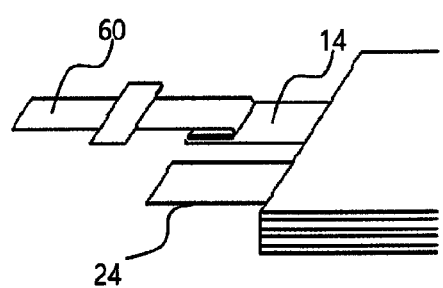

While electrode lead 60 may be placed in parallel above the electrode lead connection tabs 14 and 24, a part of an end of the electrode lead 60 may be welded on upper ends of the electrode lead connection tabs 14 and 24 (FIG. 7A). In this state, the electrode lead 60 may be bent 180°, thus electrode lead 60 may be bent from the electrode lead connection tabs 14 and 24 toward the outside of the electrode assembly (FIG. 7B-D).

This method of connecting the electrode lead connection tabs 14 and 24 and the electrode lead 60 by bending may be applied to at least any one of a positive electrode tab and a negative electrode tab.

Figure 8:
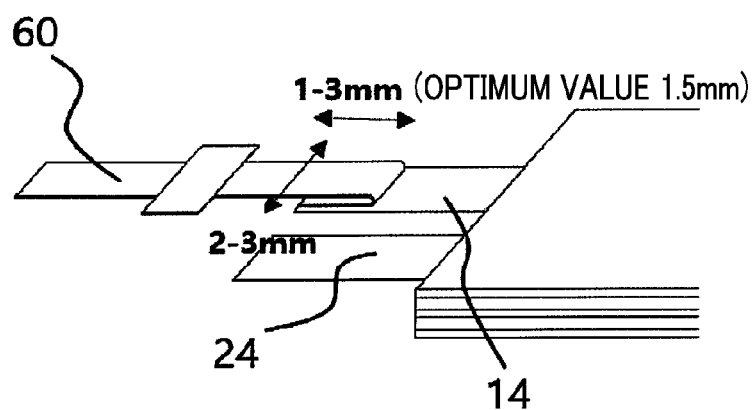
FIG. 8 shows different sizes of an electrode lead portion joined on an electrode lead connection tab, in accordance with various embodiments disclosed herein.

FIG. 8 shows different sizes of an electrode lead portion that may be joined on an electrode lead connection tab, in accordance with various embodiments disclosed herein. As depicted, a joint portion of the electrode lead 60 that may be joined to the upper end of the electrode lead connection tab extended from the electrode plate of the electrode assembly may have a width of, e.g., 2 mm to 3 mm and a length of, e.g., 1 mm to 3 mm. The joint portion may have an optimal length of 1.5 mm. However, this is just an example and the present disclosure is not limited thereto.

Figure 9:
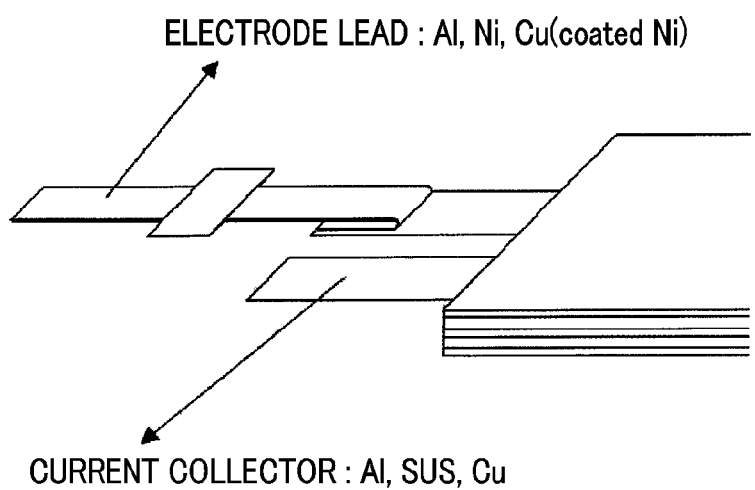
FIG. 9 shows different materials of an electrode lead connection tab and an electrode lead, in accordance with various embodiments disclosed herein.

FIG. 9 shows different materials of an electrode lead connection tab and an electrode lead, in accordance with various embodiments disclosed herein. As depicted, the electrode plates may be any one of a group consisting of aluminum, stainless steel and copper, and the electrode lead may be formed of any one material of a group consisting of aluminum, nickel, or nickel-coated copper.

Figure 10:
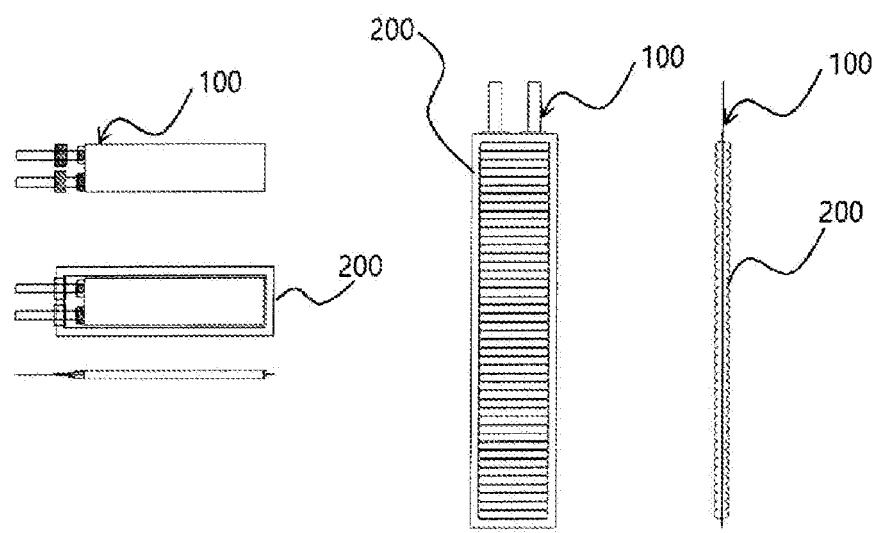
FIG. 10 illustrates a flexible battery including an electrode assembly and a case covering the electrode assembly, in accordance with at least one embodiment disclosed herein.

FIG. 10 illustrates a flexible battery including an electrode assembly and a case covering the electrode assembly, in accordance with at least one embodiment disclosed herein. As depicted, a case 200 having a structure in which upper stamping sections and lower stamping sections are alternatively repeated is placed to surround the outside of the electrode assembly according to the present disclosure.

Figure 11:
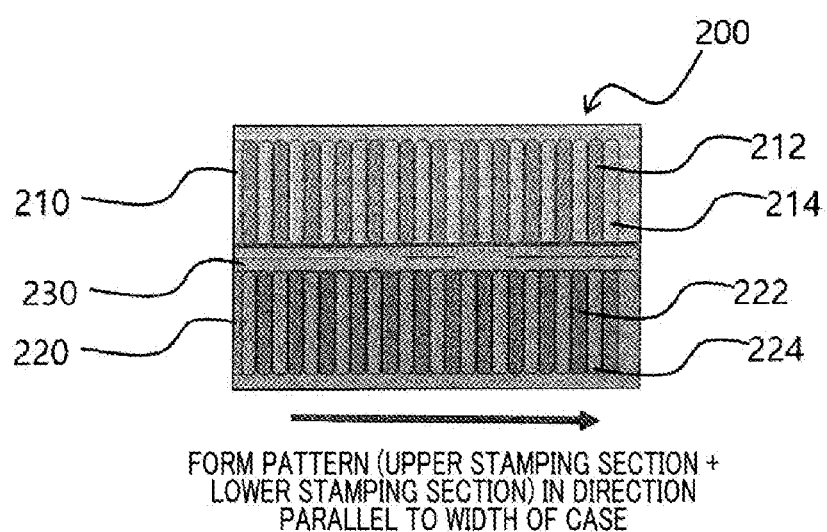
FIG. 11 illustrates a pattern of upper stamping sections and lower stamping sections formed in a direction parallel to the width of a case included in a flexible battery, in accordance with at least one embodiment disclosed herein.

FIG. 11 illustrates a pattern of upper stamping sections and lower stamping sections formed in a direction parallel to the width of a case included in a flexible battery, in accordance with at least one embodiment disclosed herein. As depicted, the multiple upper stamping sections 212 and 222 and lower stamping sections 214 and 224 repeatedly stamped on the case have a repeated pattern and shape and thus can compress and tension the flexible battery including the electrode assembly during bending, twisting, or crumpling.

The multiple upper stamping sections 212 and 222 and lower stamping sections 214 and 224 may be successively formed in a direction parallel to the width of the electrode assembly and the case.

The multiple upper stamping sections 212 and 222 and lower stamping sections 214 and 224 may be stamped by an upper mold and a lower mold, respectively.

The case surrounding the outside of the electrode assembly may include an upper case 210 and a lower case 220 on the electrode assembly based on a dotted line in a sealing portion 230. That is, multiple upper stamping sections 212 and 222 and multiple lower stamping sections 214 and 224 repeatedly formed on the case are symmetric with respect to the sealing portion 230 and symmetrically stamped on the upper case 210 and the lower case 220. In this state, the sealing portion is bent in a vertically symmetric manner and then, the electrode assembly may be housed inside the case.

The sealing portion, which may divide the upper case 210 and the lower case 220, may have a width of, e.g., 3 mm to 5 mm, and a substantive sealing may have a width of, e.g., 1 mm to 2 mm. However, this is just an example and the present disclosure is not limited thereto.

Figure 12:
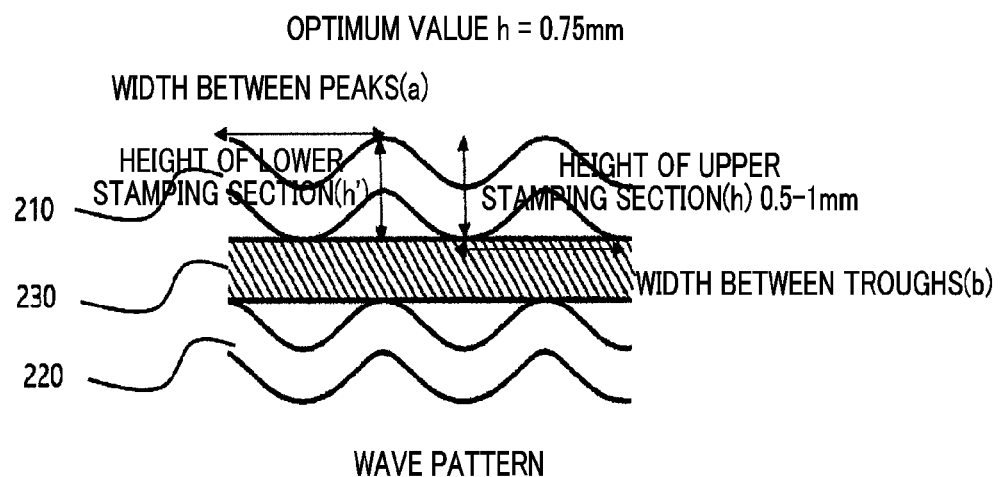
FIG. 12 illustrates different shapes of upper stamping sections and lower stamping sections formed in a case, in accordance with various embodiments disclosed herein.

FIG. 12 illustrates different shapes of upper stamping sections and lower stamping sections formed in a case, in accordance with various embodiments disclosed herein. As shown, a height h of the multiple upper stamping sections repeated on the case may be identical to a height h' of the multiple lower stamping sections repeated on the case (h=h').

The heights h and h' of the multiple upper stamping sections and lower stamping sections repeated on the case may be in the range of, e.g., 0.5 mm to 1 mm and have an optimum value of 0.75 mm. However, this is just an example and the present disclosure is not limited thereto.

Further, a width a between peaks of the multiple upper stamping sections adjacent to each other on the case may be identical to a width b between troughs of the multiple lower stamping sections (a=b), and, thus, a wave pattern is formed.

Figure 13:
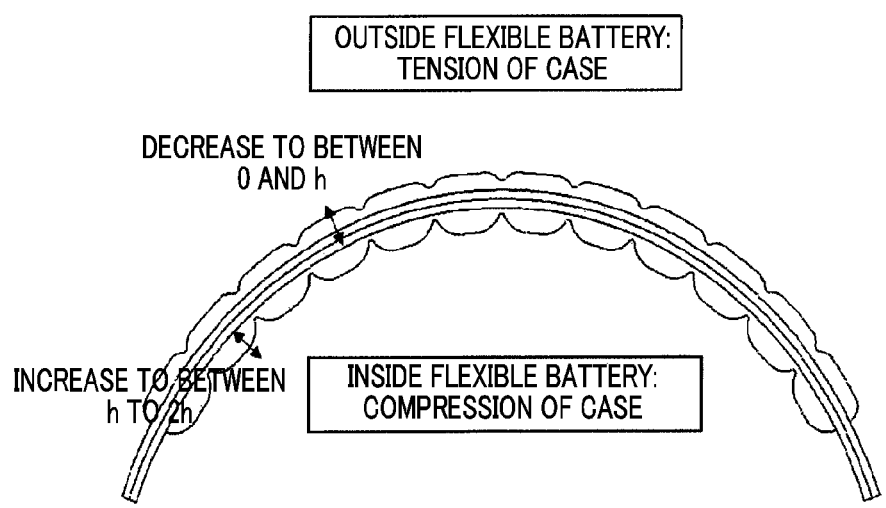
FIG. 13 illustrates deformation occurring inside/outside of a case when a flexible battery is bent, in accordance with at least one embodiment disclosed herein.

FIG. 13 illustrates deformation occurring inside/outside of a case when a flexible battery is bent, in accordance with at least one embodiment disclosed herein. As shown, when the case forming the flexible battery is applied with external force and deformed to be bent, tensile stress is applied onto the case outside the flexible battery and compressive stress is applied onto the case inside the flexible battery.

Inside the flexible battery, the height h of the repeated upper stamping sections increases to between h to 2h due to the compressive stress caused by bending, twisting, or crumpling. Outside the flexible battery, the height h of the repeated upper stamping sections decreases to between 0 and h due to the tensile stress.

Figure 14:
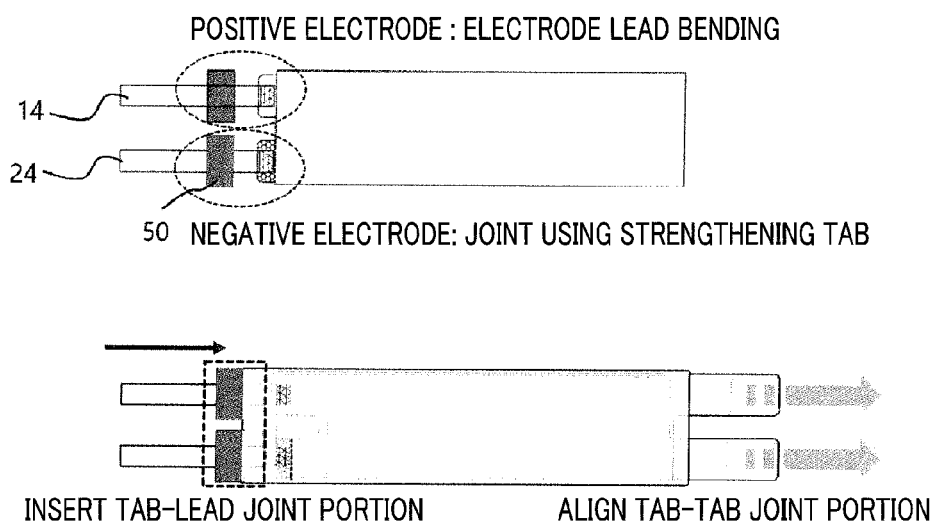
FIG. 14 illustrates that a tab-lead joint portion including a backing and strengthening joint structure between an electrode lead connection tab and an electrode lead and an electrode lead bending structure is inserted into an electrode assembly and electrodes are aligned, in accordance with at least one embodiment disclosed herein.

FIG. 14 illustrates that a tab-lead joint portion including a backing and strengthening joint structure between an electrode lead connection tab and an electrode lead and an electrode lead bending structure is inserted into an electrode assembly and electrodes are aligned, in accordance with at least one embodiment disclosed herein, multiple structures employ the method of joining an electrode lead connection tab and an electrode lead. That is, a first tab-lead joint portion has a structure in which backing and strengthening is implemented by a strengthening tab added between an electrode lead connection tab and an electrode lead, and a second tab-lead joint portion has a structure in which while a part of an end of the electrode lead is welded on the upper ends of the electrode lead connection tabs 14 and 24, the electrode lead is bent in the 180° opposite direction toward the outside of the electrode assembly. FIG. 14 illustrates that the tab-lead joint portion including a backing and strengthening joint structure and an electrode lead bending joint structure is inserted into the electrode assembly and then aligned by a tab-tab joint portion.

Figure 15:
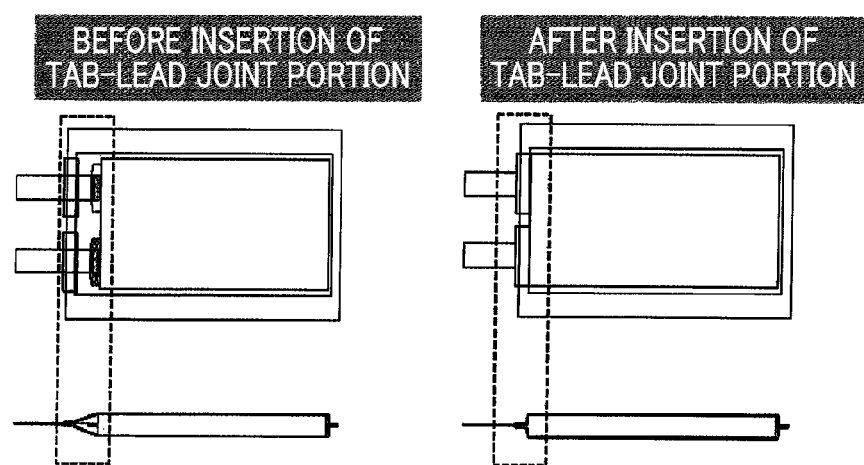
FIG. 15 shows a comparison between a battery that includes an electrode assembly in which a tab-lead joint portion is inserted and electrodes are aligned at the same time, in accordance with at least one embodiment disclosed herein, and a battery that does not include the electrode assembly.

FIG. 15 shows a comparison between a battery that includes an electrode assembly in which a tab-lead joint portion is inserted and electrodes are aligned at the same time, in accordance with at least one embodiment disclosed herein, and a battery that does not include the electrode assembly.

Figure 17:
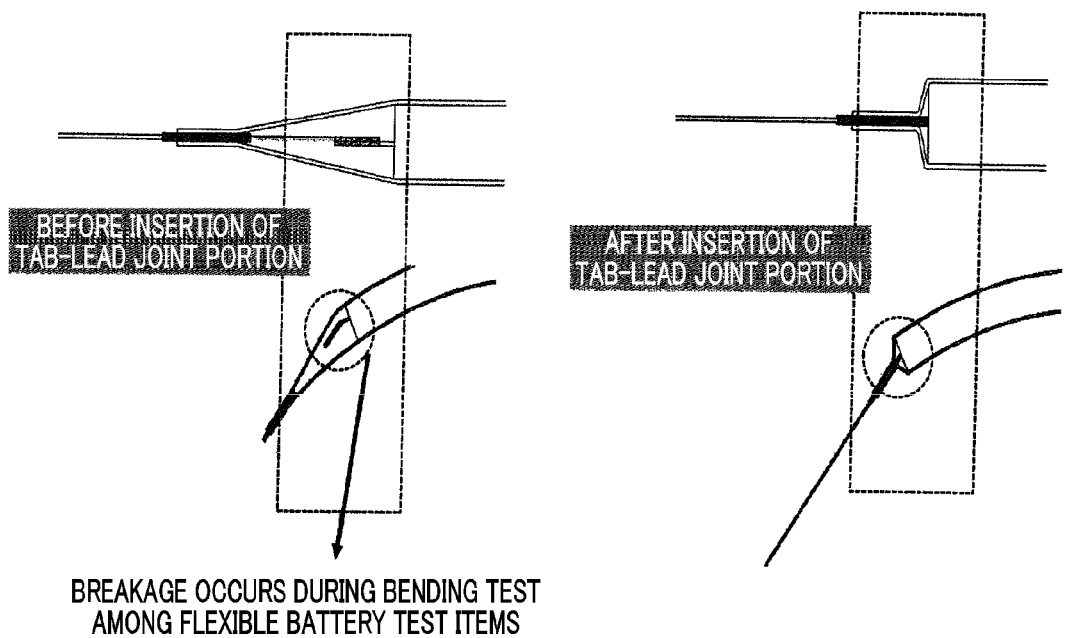
FIG. 17 shows a comparison between the results of bending tests before and after a tab-lead joint portion that includes a backing and strengthening joint structure and an electrode lead bending structure is inserted into an electrode assembly.

FIG. 17 shows a comparison between the results of bending tests before and after a tab-lead joint portion that includes a backing and strengthening joint structure and an electrode lead bending structure is inserted into an electrode assembly. As shown, in depiction (on the left), before the tab-lead joint portion, which may include the backing and strengthening joint structure using the strengthening tab 50 and the electrode lead bending joint structure, is inserted into the electrode assembly, breakage occurs on the joint portion between the electrode lead connection tab and the electrode lead in a bending test on the flexible battery.

However, in the depiction (on the right), after the tab-lead joint portion, which may include the backing and strengthening joint structure using the strengthening tab 50 and the electrode lead bending joint structure, is inserted into the electrode assembly, there is no breakage on the joint portion between the electrode lead connection tab and the electrode lead during a bending test on the flexible battery.

Figure 16:
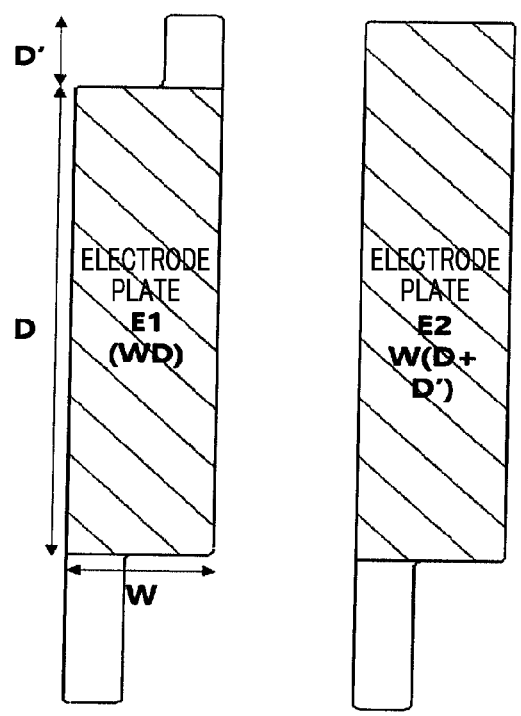
FIG. 16 illustrates an example embodiment of an electrode plate included in an electrode assembly to insert a tab-lead joint portion including a backing and strengthening joint structure and an electrode lead bending structure into the electrode assembly, as disclosed herein.

FIG. 16 illustrates an example embodiment of an electrode plate included in an electrode assembly to insert the tab-lead joint portion including the backing and strengthening joint structure using the strengthening tab 50 and the electrode lead bending structure into the electrode assembly, as disclosed herein.

The electrode plates included in the electrode assembly include a first electrode plate E1 including all the electrode lead connection tab and the electrode parallel connection tab on both sides and a second electrode plate E2 including only the electrode parallel connection tab on one side.

As for the first electrode plate E1, a portion coated with the electrode mixture has a horizontal length of W and a vertical length of D and thus has an area of WD. The electrode lead connection tab has a vertical length of D'.

As for the second electrode plate E2, a portion coated with the electrode mixture has a horizontal length of W and a vertical length of D+D' and thus has an area of W(D+D').

With the above-described structure, the tab-lead joint portion can be inserted into the electrode assembly and aligned at the same time when the cell can be driven stably.

Hereafter, a specific example of experimental conditions for the flexible battery including the backing and strengthening joint structure using the strengthening tab 50 and the electrode lead bending joint strengthening structure will be described.

A bending test was performed on the flexible battery according to the present disclosure with a cylindrical structure of an R20 battery to test bending properties. To be specific, the test was repeated 5000 times, and the flexible battery was confirmed as having a capacity retention of 90% or more.

A specific operating environment is as shown in the following Table 1.

TABLE 1

| | | |
|---|---|---|
| Nominal Capacity (mAh) | | 50 |
| Energy Density (Wh/L) | | 114 |
| Nominal Voltage | | 3.8 V |
| Charging Voltage | | 4.35 V |
| Operating Temp. | | −10~35° C. |
| Storage Temp. | | −20~45° C. |
| Size | Width | 16 ± 0.5 mm |
| | Thickness | 2 ± 0.2 mm |
| | Length | 52 ± 1.0 mm |

The present disclosure makes it possible to implement a stable flexible battery in which a strengthening tab formed as a metal plate having a predetermined thickness is placed between an electrode lead and an electrode lead connection tab included in an electrode assembly when the electrode lead and the electrode lead connection tab are assembled and an electrode lead bending joint structure is combined, and, thus, electrochemical properties can be maintained by minimizing local mechanical load caused by bending of the flexible battery.

We claim:

1. A flexible battery, comprising:
an electrode assembly having at least two unit cells, each of the unit cells including:
a pair of electrode plates having different polarities,
a separator interposed between the respective electrode plates, and
electrode tabs that protrude from the respective electrode plates;
a pair of electrode leads connected to electrode tabs; and
a strengthening tab fixed on any one electrode lead connection tab among the electrode tabs,
wherein a tab-lead joint portion at which the electrode lead connection tab and an electrode lead are connected together is inserted into the electrode assembly so that the tab-lead joint portion is located inside the electrode assembly, and
a length of a portion coated with an electrode mixture among a first electrode plate connected to the tab-lead joint portion is shorter than a length of a portion coated with an electrode mixture among a second electrode plate not connected to the tab-lead joint portion.

2. The flexible battery of claim 1, wherein either electrode lead of the pair of electrode leads is fixed to the strengthening tab, which is added between the electrode lead connection tab and the electrode lead and connected to the electrode lead connection tab.

3. The flexible battery of claim 1, wherein either electrode lead of the pair of electrode leads is bent in a direction toward the outside of the electrode assembly from a direction toward the inside of the electrode assembly.

4. The flexible battery of claim 1, wherein an electrode parallel connection tab among the electrode tabs connects electrode plates having the same polarity among multiple stacked electrode plates.

5. The flexible battery of claim 4, wherein a tab-tab joint portion at which the electrode plates having the same polarity are electrically connected in parallel to each other through the electrode parallel connection tab is disposed on a separator covering an outer surface of the outermost electrode plate placed on the uppermost end or the lowermost end of the electrode assembly.

6. The flexible battery of claim 1,
wherein the electrode plates include a first electrode plate having electrode lead connection tab and the electrode parallel connection tab on opposing sides and a second electrode plate having only the electrode parallel connection tab on one side, and
an electrode mixture is coated on the second electrode plate to overlap the electrode lead connection tab of the first electrode plate.

7. The flexible battery of claim 1, further comprising:
a case in which upper stamping sections and lower stamping sections are repeatedly formed, surrounding the outside of the electrode assembly.

8. The flexible battery of claim 7, wherein the multiple upper stamping sections and lower stamping sections are successively formed in a direction parallel to the width of the electrode assembly and the case.

9. The flexible battery of claim 1, wherein the electrode mixture coated on the second electrode plate covers the electrode lead connection of the first electrode plate.

* * * * *